(12) United States Patent
Hui et al.

(10) Patent No.: US 10,599,898 B2
(45) Date of Patent: Mar. 24, 2020

(54) WARRANTY TRACKING METHOD FOR A CONSUMER PRODUCT

(71) Applicant: TIME WIN 88 LIMITED, Hong Kong (CN)

(72) Inventors: Wing Kin Martin Hui, Hong Kong (CN); Kam Ming Lui, Hong Kong (CN)

(73) Assignee: THUNDER HOST LIMITED, Hong Kong (CN)

( * ) Notice: Subject to any disclaimer, the term of this patent is extended or adjusted under 35 U.S.C. 154(b) by 0 days.

(21) Appl. No.: 16/134,450

(22) Filed: Sep. 18, 2018

(65) Prior Publication Data

US 2019/0156090 A1 May 23, 2019

(51) Int. Cl.
*G06Q 30/00* (2012.01)
*G06K 7/14* (2006.01)
*G06K 7/10* (2006.01)

(52) U.S. Cl.
CPC ....... *G06K 7/1413* (2013.01); *G06K 7/10861* (2013.01); *G06Q 30/012* (2013.01)

(58) Field of Classification Search
CPC ...... G06Q 30/06; G06Q 20/382; G06Q 10/08; G06Q 10/0875; G06Q 10/10; B65B 13/185; B65B 35/18; B65B 51/32; G06F 21/6245; G06K 1/121; G06K 7/1439; G07F 17/0028; G07F 17/16; G07F 7/025
See application file for complete search history.

(56) References Cited

U.S. PATENT DOCUMENTS

| | | | | |
|---|---|---|---|---|
| 7,035,813 B1* | 4/2006 | Cook | ..................... | G06Q 20/20 705/14.38 |
| 2003/0004889 A1* | 1/2003 | Fiala | ..................... | G06Q 20/342 705/64 |
| 2004/0117315 A1* | 6/2004 | Cornuejols | ........... | G06Q 20/382 705/64 |
| 2005/0203854 A1* | 9/2005 | Das | ....................... | G06Q 20/32 705/64 |
| 2006/0089877 A1* | 4/2006 | Graziano | ............... | G06Q 20/14 705/14.17 |
| 2010/0205091 A1* | 8/2010 | Graziano | ............. | G06Q 20/102 705/40 |
| 2011/0108622 A1* | 5/2011 | Das | ....................... | G06Q 20/32 235/380 |
| 2017/0132565 A1* | 5/2017 | Beadles | ............. | G06K 7/10297 |

* cited by examiner

*Primary Examiner* — Thien M Le
(74) *Attorney, Agent, or Firm* — Weiss & Moy, P.C.; Jeffrey D. Moy

(57) ABSTRACT

A method of authenticating the warranty of a product is disclosed. The method comprises the steps of providing a product; the product placed in a packaging; the packaging is tagged with a product tracking device which is accessible for being read by a scanner; an authentication device placed inside the packing to be physically out of reach unless the packaging has been opened; the authentication device contains an authentication code; when the authentication code in the device is read by a scanner and sent to an authentication server to authenticate the product, the server generates a warranty code linked to an account of the first buyer of the product.

5 Claims, 5 Drawing Sheets

WARRANTY TRACKING METHOD FOR A CONSUMER PRODUCT

FIELD OF INVENTION

The present invention relates to the field of anti-counterfeiting technology, and particularly to an electronic warranty system.

BACKGROUND OF THE INVENTION

Increase in consumerism in the past decades has seen a corresponding increase in product counterfeiting activities. To certify that certain products are genuine, it has been proposed to affix each product with a physical tag before the products leave factory. These tags are not removable except by using special de-tagging devices. Furthermore, each tag is uniquely identifiable. Since such tags cannot be counterfeited or removed from the products easily, products affixed with such tags may be presumed authentic. These tags may be laser tags or anti-counterfeiting rings and each contain an authentication code which provides unique identity.

A tag is identifiable by electronically reading or scanning an authentication code contained within it and sending the code via an automatic telephone voice system or the Internet to a server for authentication. If the server recognizes the authentication code the server will affirm the authenticity of the tag. In this way, the product to which a tag is affixed is presumed genuine.

Such tags have been applied even onto live produce such as the popular hairy crabs in Chinese communities.

In order to prevent theft of the authentication code contained within the tags, each tag is designed such that it will be irreparably broken if an attempt is made to open the tag. A broken tag will indicate that someone has attempted to change or tamper with the tag, causing the consumer to be suspicious of the authenticity of the product affixed with the broken tag.

To further improve security, every attempt to check the authenticity of a tag is recorded in the server. If there are counterfeit copies of a piece of authentication code, there will be a record of more attempts at authenticating the same tag at the server than has been actually made by the owner(s) of the product. In other words, if there were an unexpectedly greater number of attempts at authenticating the same tag, it would imply that the tag is not unique and there is a counterfeit of the tag somewhere. This would alert the owner that the product affixed with a tag containing the same authentication code may be counterfeit. However, in the event that there is a counterfeit tag, the first person to make an enquiry to authenticate the tag will have no idea that the counterfeit tag exists. Only the person who is making at least the second attempt to authenticate the tag may be able to detect that an earlier authentication attempt has been made which he has not made, betraying the existence of the counterfeit tag.

CN201210288489.8, entitled "Multifunctional Product Anti-counterfeiting Identifying System and Anti-counterfeiting Identifying Method Thereof", described a version of this prior art which uses a single tracking tag which actually comprises both a printed barcode and an electronic tag. Information about the product to which the tag is affixed is stored in the server, along with a record of all query attempts in verifying the tag. The shortcoming of this method is that a single tracking tag is used for obtaining information on the product and on the movements of the product. However, there is no privacy relating to the information in the tag. This allows a counterfeit tag to be made and released to the market even before the original tag is released.

CN201310546388.0, entitled "Anti-counterfeiting Tag System", discloses a method which uses two product tracking codes at once, such that authentication of a tag can be carried out even when one of the tracking codes cannot be used.

US2014/0095398 entitled "Double ID Anti-counterfeiting Method and System", discloses using two kinds of anti-counterfeiting codes for preventing counterfeiting of a tag. A first anti-counterfeiting code is a retailer's code and a second anti-counterfeiting code is a product code. Both codes must be provided to an authentication server in order that the server may authenticate the tag. The disadvantage with this method is that the retailer must have already been determined before the product leaves the factory, which limits freedom of choice of retailer severely.

None of these methods is able to effectively prevent theft of the authentication code in a tag. Furthermore, none of these methods effectively addresses the confusion which may arise when a tag is checked many times at the server for authenticity. Therefore, it is desirable to provide an improved method and an accompanying system or device to provide a possibility of mitigating these problems.

Furthermore, none of these methods are able to ensure that a digital license for warranty of a product is issued to the rightful owner.

Therefore, it is desirable to provide a method and any accompanying device to ensure that a product may be authenticated for the benefit of the owner, and also any product warranty to be issued to the rightful owner.

SUMMARY OF THE INVENTION

In a first aspect, the invention proposes a method of authenticating the warranty of a product comprising the steps of: providing a product; the product placed in a packaging; the packaging is tagged with a product tracking device which is accessible for being read by a scanner; an authentication device placed inside the packing to be physically out of reach unless the packaging has been opened; the authentication device contains an authentication code; when the authentication code in the device is read by a scanner and sent to an authentication server to authenticate the product, the server generates a warranty code linked to an account of the first buyer of the product.

Advantageously, the warranty of a product may now be provided to a user only when the user has confirmed his purchase.

Preferably, the method further comprising the steps of: receiving an account of a second buyer of the product; replacing the account of the first buyer of the product with the account of a second buyer of the product.

Advantageously, the warranty of a product may now be provided to a new owner, such that the new owner may also enjoy the warranty.

Preferably, the warranty is a barcode which is stored in the smart mobile telephone of the current buyer.

In a second aspect the invention proposes a method of authenticating the warranty of a product, wherein the warranty is a barcode which is stored in the smart mobile telephone of the current buyer.

BRIEF DESCRIPTION OF THE FIGURES

It will be convenient to further describe the present invention with respect to the accompanying drawings that illustrate possible arrangements of the invention, in which like integers refer to like parts. Other arrangements of the invention are possible, and consequently the particularity of the accompanying drawings is not to be understood as superseding the generality of the preceding description of the invention.

DETAILED DESCRIPTION OF THE INVENTION

Figure 1:
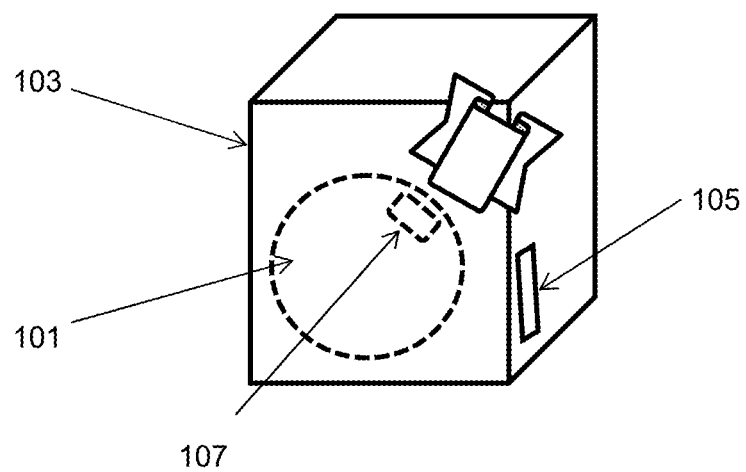
FIG. 1 shows an embodiment of the invention.

FIG. 1 shows a customer product 101 101 which may be bought over a sales counter. The product 101 is kept within a protecting packaging 103 103 or wrapping. The packaging 103 is tagged with a tracking device 105 105. The tracking device 105 is used to identify the product 101 and to determine at which stage in the logistics and sales channels is the product 101.

Typically, the tracking device 105 contains a tracking code. The tracking device 105 is accessible to anyone who handles the product 101, such as the cashier, in order that the tracking code may be read. In some preferred embodiments, the tracking device 105 is a barcode which can be read with a barcode scanner. In the simplest embodiment, however, the tracking device 105 may be merely a sticker or label onto which a numerical code which can be used at the point of sale of the product 101. When a cashier scans or enters the tracking code into the cashier system, the cashier system sends the tracking code to a remote server which records that the product 101 has been sold to a customer.

Moreover, the tracking code may be scanned when the product 101 leaves the factory, is stocked in a shop or departmental store. In this way, the tracking device 105 is useable to determine where in the logistic chain is the product 101.

Figure 2:
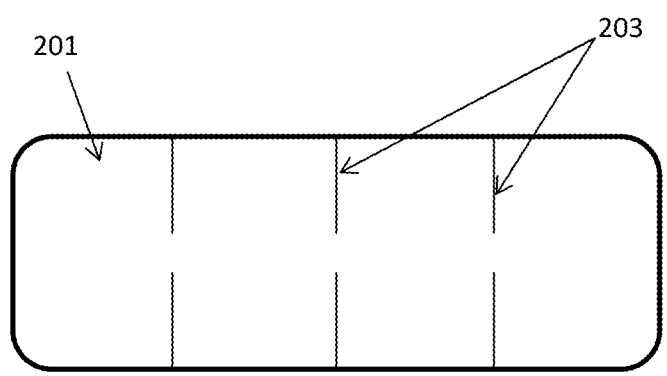
FIG. 2 shows a possible authentication tag used in the embodiment of FIG. 1.

Typically, the tracking device 105 is made of a breakable sticker which cannot be removed once it is stuck to the product 101. An illustration of a breakable sticker 201 is shown in FIG. 2. The sticker 201 was pre-made with slits 203 cut into it. The sticker 201 may be removed from its backing paper and be affixed onto a surface. However, once affixed to a surface, the sticker 201 will tear along the slits 203 if an attempt is made to remove it from the surface. Alternative devices which may be used in placed of the breakable sticker include RFIDs or Bluetooth tags. For Bluetooth tags, however, battery access must be provided outside the packaging 103.

As soon as the server receives the tracking code, the server records that the product 101 has been sold to a customer, and the server is ready to accept requests to authentication the product 101.

For the purpose of authenticating the product 101, the product 101 is also attached with an authentication device 107 107. However, unlike the tracking device 105, the authentication device 107 is not readily accessible to any person, not even the cashier. The authentication device 107 is kept inside the packaging 103. In order to access the authentication device 107, any person must first break the packing. Therefore, if the product 101 has not yet been sold but the packaging 103 shows signs of tampering, the customer will typically be alerted to reject the product 101 and that both the product 101 and the authentication device 107 might have been replaced.

Figure 3:
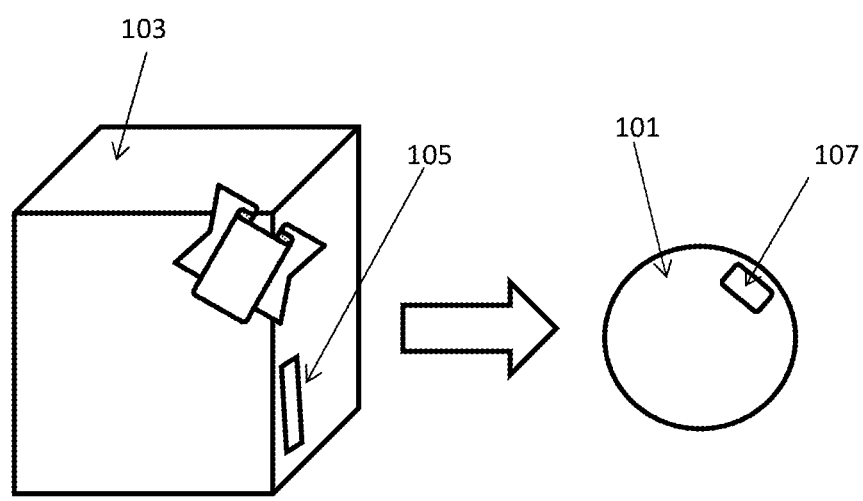
FIG. 3 shows a product of the first embodiment removed from its packaging.

FIG. 3 illustrates the product 101 removed out of the packaging 103. In FIG. 3, the authentication device 107 is shown affixed to the product 101 itself. Preferably, the product 101 is embedded with the authentication device 107. For product 101s which cannot be embedded with an authentication device 107 or somehow irreversibly affixed with an authentication device 107, the packaging 103 of the product 101 is relied upon to protect the authentication device 107 until someone opens the packaging 103. However, it may well be possible that the authentication device 107 is simply affixed to an internal surface of the packaging 103.

When the product 101 is removed from the packaging 103, the customer is able to access the authentication device 107 protecting within the packaging 103. The authentication device 107 is affixed to the product 101 within the packaging 103 in the factory, at about the same time as the tracking device 105 is attached to the exterior of the packaging 103. The authentication device 107 contains an authentication code which can be used to verify if the product 101 is genuine.

The authentication code contained within the authentication device 107 and the tracking code contained within the tracking device 105 are established as a pair, the pairing of which is known only to the manufacturer. Therefore, a product 101 is sold bearing two physical identification devices, one being a tracking device 105 and the other an authentication device 107.

Figure 4:
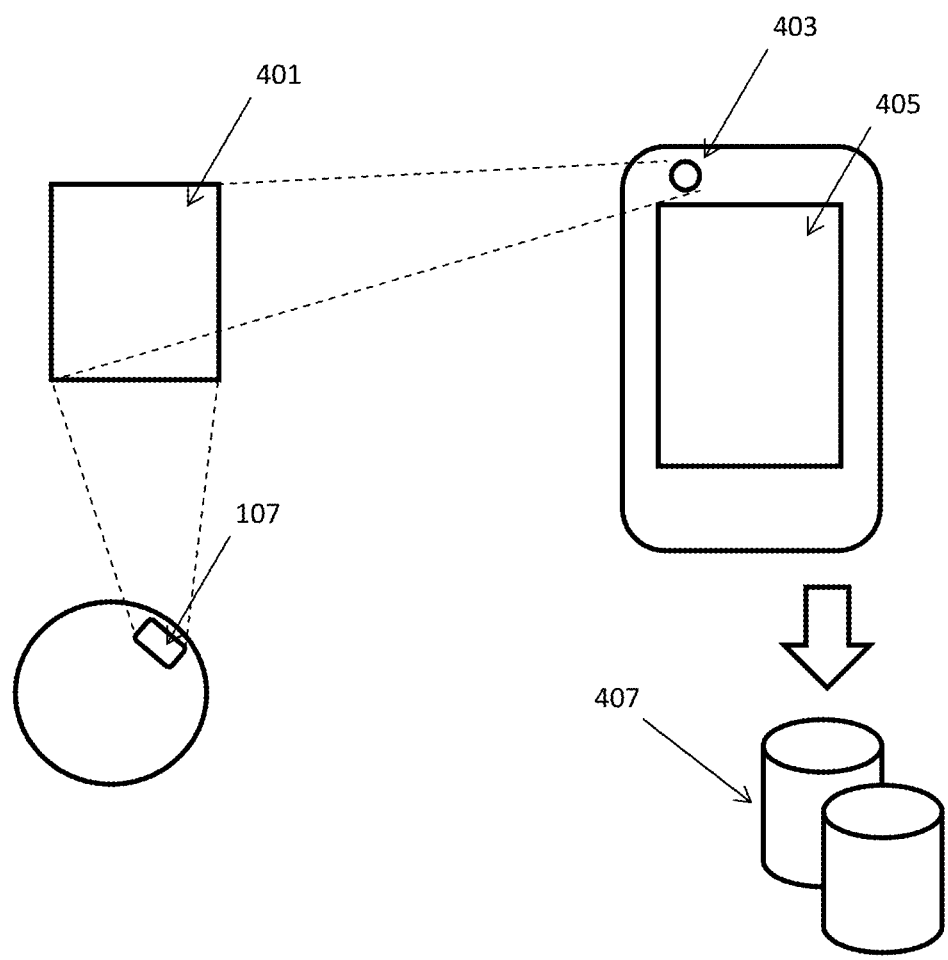
FIG. 4 shows how an authentication code may be used in the embodiment of FIG. 1.

In a preferred embodiment, the authentication device 107 is a printed QR code. A QR code (abbreviated from Quick Response Code) is a type of matrix barcode (or two-dimensional barcode) and is a machine-readable optical label that contains information about the item to which it is attached. As illustrated in FIG. 4, to use a QR code, the user simply takes a picture of the code with his smart phone or a similar optical device, and sends the code to an appropriate server via a suitable program. A QR code cannot be easily copied by human reading and writing, unlike a textual code.

As illustrated in FIG. 4, the customer then takes a picture of the QR code 401 by the camera 403 his smart phone 405 and sends the QR code off for authentication at the manufacturer's website or by the manufacturer's smart phone application. When the manufacturer's server 407 receives the authentication code, the server 407 responds to the website or the smart phone application with information on the purchased product 101, such as the product 101 identity, manufacture date, location of sales and so on to authenticate the product 101. In this way, the customer will be able to tell if the product 101 is a genuine one.

The order in which the server 407 receives information on the tracking device 105 and the authentication device 107 having been used may also be used for security. In general, the authentication device 107 has to reach the server 407 only after the tracking device 105 has been read by a cashier at the point of sale. If any customer used the authentication code to verify his product 101, and the authentication reaches the server 407 before the server 407 has been alerted by receiving the tracking device 105 from cashier, it means that the authentication device 107 must have been a stolen one or the product 101, even if genuine, must have been stolen. This also prevents the case of someone re-using both the tracking code and the authentication code. For example, someone might try to keep the genuine packaging 103 intact and re-using it to pack a counterfeiting product 101, or the actual product 101 may be stolen or re-sold illegally. Also, in the event that the authentication code is copied by counterfeiters and applied to many counterfeit product 101s, it is possible for the server 407 to note that there are counterfeited authentication code in the market if it notices that certain customers have attempted to authenticate a product 101 before the tracking code has been received.

When the server 407 receives the authentication in proper order, i.e. after the tracking code has been received, the server 407 may then generate a warranty code. The warranty code is sent to the authentication device 107 associated with the personal account of the owner of the product 101 (which may be the customer or someone who legitimately receives the product 101). The warranty code may be a textual code or a QR code which is linked to the customer's account. That is, the customer is typically invited to create online an account at the manufacturer's website. The account is preferably linked to the customer's smart phone number so that confirmation of the opening of his customer account may be facilitated via his smart phone 405.

The warranty is only generated when the product 101 has been authenticated at the server 407. The warranty code is associated with the moment the tracker device was read by the casher and sent to the server 407 or when the customer sent the authentication code to the server 407. This records a time stamp of the moment, which commences countdown of the warranty period.

When the product 101 needs repair or if further service is required for the product 101 (such as a software update on so on), the warranty code must be presented to the repair counter along with the authentication device 107 or code. Absence of the warranty code will cause the repair counter to decline repairing the product 101. In order for the product 101 to be transferred legitimately to another person, the warranty code and the authentication device 107 or code must also be transferred. The authentication code must be registered against the new owner's account which is determined by his mobile telephone number, and also the warranty must also be transferred to his account.

In this case, any legitimate owner of the product 101 is able to have bought the product 101 from an earlier owner, by identifying himself with a transferred warranty code.

In order that the product 101 may be given as a gift or sold as a second hand product 101, the warranty code must be transferrable. The warranty code may be transferred by email or other means from the customer's account to a storage device of the new owner. The new memory storing the warranty code is preferably the new owner's smart phone. The server 407 automatically records the day when the tracking code was received as the first day of the warranty period, and countdown to the end of the warranty period begins. To obtain service during the warranty period, both the authentication code and the warranty code must be presented to the manufacturer or its service center.

Figure 5:
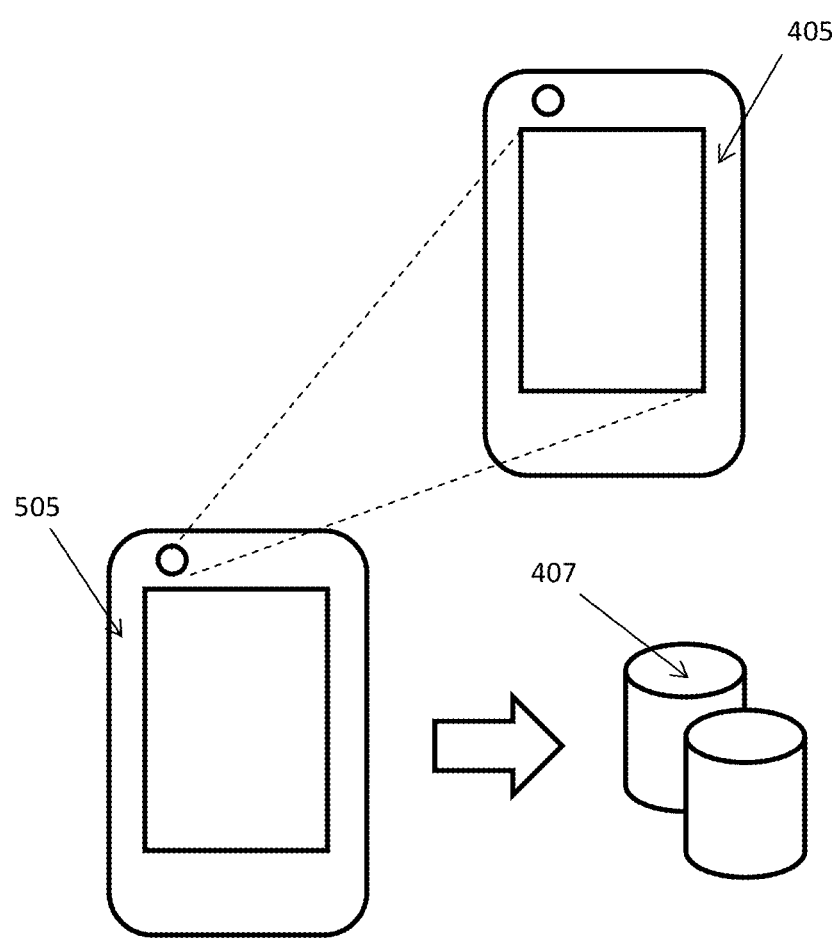
FIG. 5 shows how the warranty of the embodiment of FIG. 1 may be transferred.

FIG. 5 illustrates how the warranty code may be a QR code which can transferred simply by the new owner using his smart phone 505 to take a picture of the QR code off the screen of the smart phone 405 of the old owner. An appropriate application in the new smart phone 505 may be used to inform the server 407 of the transfer.

Preferably, the new owner must also register an account with the manufacturer in order that the warranty code may be assigned to his own account.

Preferably, the authentication device 107 itself may be physically kept after it was retrieved from within the packaging 103. Therefore, if someone buys the product 101 from the old owner, and this new owner wants to repair the product 101, the new owner must take the authentication device 107 with him the repair centre and present a copy of the warranty code to the service centre.

Advantageously, the warranty code may be used to discourage theft of a genuine product 101. If the warranty code has not been transferred to the new owner, the repair centre may consider the product 101 not having been presented by the rightful owner.

Goods which may rely on the embodiment includes high end customer product 101s, e.g. luxury bag or phone which has warranty promise which requires product 101 registration. However, where the product 101s has a warranty period during which the manufacturer is obliged to provide repair or improvements In this invention, the authentication code cannot be destroyed for the sake of identifying for warranty purpose.

Figure 6:
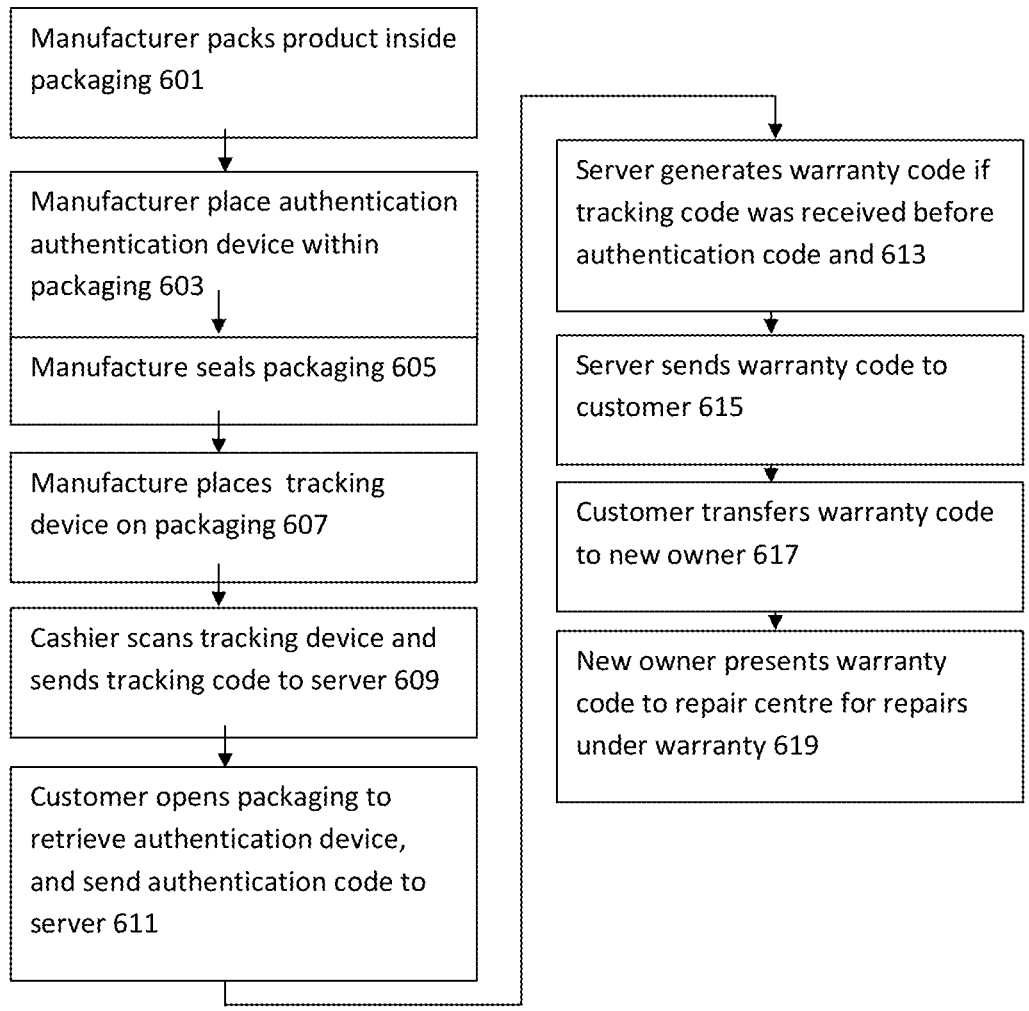
FIG. 6 is a flowchart showing how the embodiment of FIG. 1 may be provided and used.

FIG. 6 is a flowchart which shows the steps which may be taken with some embodiments. Firstly, in step 601, the manufacturer makes the product 101 and places the product 101 into its packaging 103. However, in step 603, the manufacturer also places the authentication device 107 inside the packaging 103. The manufacturer then seals the packaging 103, in step 605. This prevents the authentication device 107 from being accessed by any person except someone who opens the packaging 103. To allow the product 101 to be traceable, in step 607, the manufacturer places the tracking device 105 onto the packaging 103. Therefore, the product 101 can be tracked through any warehouses, departmental stores, shelves and so on. At the point of sale, however, the cashier simply scans the tracking code by a networked cashier system, at step 609, which sends the tracking code to the server 407 to record that the product 101 has been sold. This alerts the server 407 that the authentication device 107 may be accessed anytime from now. The customer then opens the packaging 103 to retrieve the product 101, at step 611, and retrieves the authentication code from the authentication device 107, which is preferably a QR code. The customer then sends the QR code to the server 407, via the merchant's smart phone application or website. The server 407 responses with information on the product 101, which allows the user to know that the product 101 is verified and genuine. At the same time, at step 613, if the server 407 determines that the tracking code has been retrieved from the cashier before the authentication code has been received from the customer, the server 407 then determines that a proper sale has been made and generates a warranty code. At step 615, the warranty code is sent to the customer's mobile phone. It is preferred that the mobile phone is registered with the server 407. In the event that the user wishes to sell or transfer his product 101 to another person, at step 617, the other person will become the new owner of the product 101. The customer will then have to transfer the warranty code to the new owner, such as by short messaging services (SMS) or email, and so on. When the new owner wishes to repair or upgrade the product 101 at a repair centre, at step 619, the warranty code must be presented to the repair centre. It is optional in different embodiments that the authentication code or the entire authentication device 107 must be presented along with the warranty code.

While there has been described in the foregoing description preferred embodiments of the present invention, it will be understood by those skilled in the technology concerned that many variations or modifications in details of design, construction or operation may be made without departing from the scope of the present invention as claimed.

The invention claimed is:

1. A method of authenticating the warranty of a product comprising the steps of:
   providing a product;
   the product placed in a packaging;
   the packaging is tagged with a product tracking device which is accessible for being read by a scanner, the product tracking device used to identify the product and tracking logistic and sales channel of the product;
   an authentication device placed inside the packing to be physically out of reach unless the packaging has been opened;
   the authentication device contains an authentication code;
   when the authentication code in the device is read by a scanner and sent to an authentication server to authenticate the product by comparing a tracking code of the tracking device to the authentication code, the server generates a warranty code linked to an account of the first buyer of the product when the tracking code and the authentication code are authenticated as a pair by the authentication server.

2. The method of authenticating the warranty of a product of claim 1, further comprising the steps of:
   receiving an account of a second buyer of the product;
   replacing the account of the first buyer of the product with the account of the second buyer of the product; and
   transferring the warranty code of the first buyer to the second buyer.

3. The method of authenticating the warranty of a product of claim 1 wherein the product tracking device is a QR code.

4. The method of authenticating the warranty of a product of claim 1 wherein the authentication code is a QR code.

5. The method of authenticating the warranty of a product of claim 1 wherein the warranty code is a QR code.

* * * * *